US012752365B2

(12) United States Patent
Nitz et al.

(10) Patent No.: US 12,752,365 B2
(45) Date of Patent: Oct. 6, 2026

(54) SYSTEM FOR DRAWING OFF THE ELECTRODE CAPS FROM ELECTRODE ADAPTERS

(71) Applicant: BRAEUER SYSTEMTECHNIK GMBH, Annaberg-Buchholz (DE)

(72) Inventors: Jens Nitz, Sehmatal-Sehma (DE); Robin Kuettner, Crottendorf (DE); Jens Stopp, Ehrenfriedersdorf (DE)

(73) Assignee: BRAEUER SYSTEMTECHNIK GMBH, Annaberg-Buchholz (DE)

( * ) Notice: Subject to any disclaimer, the term of this patent is extended or adjusted under 35 U.S.C. 154(b) by 275 days.

(21) Appl. No.: 18/558,542

(22) PCT Filed: May 4, 2022

(86) PCT No.: PCT/EP2022/061965

§ 371 (c)(1),
(2) Date: Nov. 2, 2023

(87) PCT Pub. No.: WO2022/238195

PCT Pub. Date: Nov. 17, 2022

(65) Prior Publication Data

US 2024/0217025 A1 Jul. 4, 2024

(30) Foreign Application Priority Data

May 14, 2021 (DE) ..................... 10 2021 112 548.0

(51) Int. Cl.
*B23K 11/30* (2006.01)
*B23B 31/12* (2006.01)
*B23B 31/16* (2006.01)

(52) U.S. Cl.
CPC ...... *B23K 11/3072* (2013.01); *B23B 31/1269* (2013.01); *B23B 31/16275* (2013.01)

(58) Field of Classification Search
CPC .................................................. B23K 11/3072
See application file for complete search history.

(56) References Cited

U.S. PATENT DOCUMENTS 6,971,283 B2 12/2005 Belik

FOREIGN PATENT DOCUMENTS

| | | | | | |
|---|---|---|---|---|---|
| DE | 702445 | C | | 2/1941 | |
| DE | 817231 | C | | 10/1951 | |
| DE | 88 08 586 | U1 | | 11/1989 | |
| DE | 202 09 401 | U1 | | 10/2002 | |
| DE | 10202827 | A1 | * | 7/2003 | ........... B25B 13/488 |
| DE | 203 10 763 | U1 | | 10/2003 | |
| DE | 102012005259 | A1 | * | 9/2013 | ......... B23K 11/3063 |
| DE | 102014209828 | A1 | * | 11/2015 | ......... B23K 11/3072 |

(Continued)

OTHER PUBLICATIONS

Translation of DE-102014209828-A1 (Year: 2015).*
Translation of KR-101692981-B1 (Year: 2017).*

*Primary Examiner* — Jacob J Cigna
(74) *Attorney, Agent, or Firm* — Norman B. Thot

(57) ABSTRACT

A system for removing an electrode cap from an electrode shaft. The system includes at least one electrode cap removal device which is mounted to rotate about a tool axis of rotation. The at least one electrode cap removal device has a clamping device for fixing the electrode cap to be removed. The clamping device is a combination of a straight-toothed clamping device and a helical-toothed clamping device.

6 Claims, 2 Drawing Sheets

(56) References Cited

FOREIGN PATENT DOCUMENTS

| | | | | | |
|---|---|---|---|---|---|
| EP | 2 647 462 | B1 | | 5/2017 | |
| EP | 3 335 824 | A1 | | 6/2018 | |
| GB | 25830 | A | | 4/1910 | |
| KR | 101692981 | B1 | * | 1/2017 | ............ B23K 11/30 |

* cited by examiner

SYSTEM FOR DRAWING OFF THE ELECTRODE CAPS FROM ELECTRODE ADAPTERS

CROSS REFERENCE TO PRIOR APPLICATIONS

This application is a U.S. National Phase application under 35 U.S.C. § 371 of International Application No. PCT/EP2022/061965, filed on May 4, 2022 and which claims benefit to German Patent Application No. 10 2021 112 548.0, filed on May 14, 2021. The International Application was published in German on Nov. 17, 2022 as WO 2022/238195 A1 under PCT Article 21(2).

FIELD

The present invention relates to a device for removing electrode caps from electrode shafts in a resistance spot welding method.

BACKGROUND

Spot welding is frequently used to connect metal sheets and strips. This method is in particular used in vehicle body production in automated assembly lines in the automotive industry.

A plurality of welding robots is typically used in this case to connect the vehicle body sheet metal parts to one another by spot welding. The welding robots are equipped with welding tongs, the electrode shafts of which are equipped with one spot-welding electrode in each case, which are referred to as the electrode caps.

The welding tongs are moved towards the positioned metal sheets that are to be welded to one another. The exact positioning of the welding tongs with respect to the metal sheets to be welded, and the arrangement of the metal sheets with respect to one another, currently takes place in an automated and computer-assisted manner. In an automated assembly line of this kind, the welding processes take place in the quickest possible frequency and free of interruptions.

The electrode caps are as a result in particular subject to a high degree of wear since the contact surfaces of the electrode caps come into contact with the vehicle body metal sheets to be welded in each case. In this welding process, current flows between the electrodes, through the vehicle body metal parts that are to be welded, and are adjacent to one another. A change occurs at the contact surfaces of the electrode caps in the weld inflow zone of the electrode caps in this case.

Burn-off beads, which cause a change in the welding conditions due to an increase in the size of the contact surface, frequently form at the edge of the contact surfaces. In order to avoid having to respond to this change via an uneconomical tracking of the current strength, the electrode caps are regularly reworked, in accordance with their loading and resulting wear, by milling.

Milling cutters are arranged for this purpose so that the welding robots can reach these, via their welding tongs, and the electrode caps are brought into engagement with the milling cutter installed in each case. The electrode cap milling cutters are generally formed of a tool carrier comprising at least one milling tool that is mounted therein so as to be rotatable about a tool axis of rotation, and a drive for the milling tool.

Interacting electrodes of welding tongs frequently wear to the same or a similar extent, so that these must be regularly and simultaneously reworked by milling. After a number of reworking processes have been performed, material has been removed from the electrode cap to such an extent that the cap must be replaced. The work electrode caps are removed for this purpose from the electrode shafts.

During removal of the electrode caps from the welding electrode shafts, the electrode caps are firmly clamped, at their cylindrical lateral surfaces, via clamping jaws. The electrode cap is then rotated about its axis or that of the welding electrode shaft that is held in a torsion-proof manner, and is removed from the welding electrode shaft in its axial direction.

Hand removal devices are known for this purpose, which should not, however, be used in automated assembly lines due to risk to personnel.

Devices for removing electrode caps are described, for example, in DE 20209401 U1. DE 20209401 U1 describes a device for removing electrode caps in which the electrode cap is positioned on an electrode shaft at a small distance from an approach flange of the electrode shaft. A peripheral, groove-shaped clearance results in this case between the approach flange and the approach flange-side end of the electrode cap, in which clearance a wedge, which becomes thicker tangentially in the direction of the width of the clearance, engages.

DE 8808586 U1 describes a device in which the electrode caps are removed from the electrode cap shafts via a lever construction.

Removal devices have also been described which are arranged in a tool carrier. These removal devices comprise a removal tool which is mounted so as to be rotatable about a tool axis of rotation, and a drive for the removal tool. The electrode caps are fixed by clamping jaws arranged in the removal tool. The electrode cap is then rotated about its axis or that of the welding electrode shaft that is held in a torsion-proof manner, and is removed from the welding electrode shaft, in its axial direction.

A further known solution is that the electrode cap is not removed from the electrode shaft, but rather the electrode shaft is removed from the rotating cap by opening the welding tongs. In the case of these devices, the cap is also fixed by clamping jaws, and in the process rotated about its axis or that of the welding electrode shaft that is held in a torsion-proof manner, and the electrode shaft is removed from the electrode cap when the tongs are opened.

A removal tool for removing electrode caps of cap carriers of spot welding electrodes described in DE 10 2014 209 828 A1 comprises a tool body (24) that is rotatable about an axis of rotation (A), in removal operation, and has an electrode cap receiving opening (56) that is open towards the electrode cap receptacle, in the direction of the axis of rotation (A), a first set (26) of clamping jaws for clamping engagement with an electrode cap (20) positioned in the electrode cap receiving opening (56), at least in the case of rotation of the tool body (24) about the axis of rotation (A) in a first direction of rotation (R1), a second set (28) of clamping jaws for clamping engagement with an electrode cap (22) positioned in the electrode cap receiving opening (56), at least in the case of rotation of the tool body (24) about the axis of rotation (A) in a second direction of rotation (R2) that is opposite to the first direction of rotation (R1).

The described interchangeable head types according to the prior art are primarily equipped either with straight-toothed jaws or helical-toothed jaws. Three jaws are typically used in this case. This design has the advantage that the tools or workpieces to be fixed can be easily centered.

A disadvantage in the case of the variant comprising exclusively straight-toothed jaws is, however, that when the electrode caps are released from the tong shaft there is no, or only a slight, fixing against an axial movement. A premature uncontrolled loss of the electrode caps after the removal process may thus occur.

This problem does not arise in the case of the developed interchangeable head variant comprising exclusively helical-toothed jaws. The helical toothing provides that the tong shafts are protected during release of the electrode caps by a thread effect, since during cutting into the base material, the cap is pushed in an axial direction, and thus away from the electrode shaft, by the oblique positioning of the toothing. Since the electrode cap is moved quickly away from its seat during the rotation of the interchangeable head, there is thus less/briefer friction between the contact surfaces of the electrode cap cone and the associated shaft, and a fixing of the electrode caps against an axial movement thus takes place.

The released electrode cap is thus securely held. It is, however, disadvantageous that the required rotational angle for the two-part process, consisting of cutting until the electrode cap grips, and initiating a rotational movement, increases as a result, and the effectively resulting rotational angle in the “release phase” becomes smaller.

SUMMARY

An aspect of the present invention is to design a removal device of the type mentioned above which avoid the difficulties of previously described solutions to the greatest extent possible, and which in particular provides process reliability.

In an embodiment, the present invention provides a system for removing an electrode cap from an electrode shaft. The system includes at least one electrode cap removal device which is mounted so as to be rotatable about a tool axis of rotation. The at least one electrode cap removal device comprises a clamping device for fixing the electrode cap to be removed. The clamping device comprises a combination of a straight-toothed clamping device and a helical-toothed clamping device.

BRIEF DESCRIPTION OF THE DRAWINGS

The present invention is described in greater detail below on the basis of embodiments and of the drawings in which.

DETAILED DESCRIPTION

Figure 1:
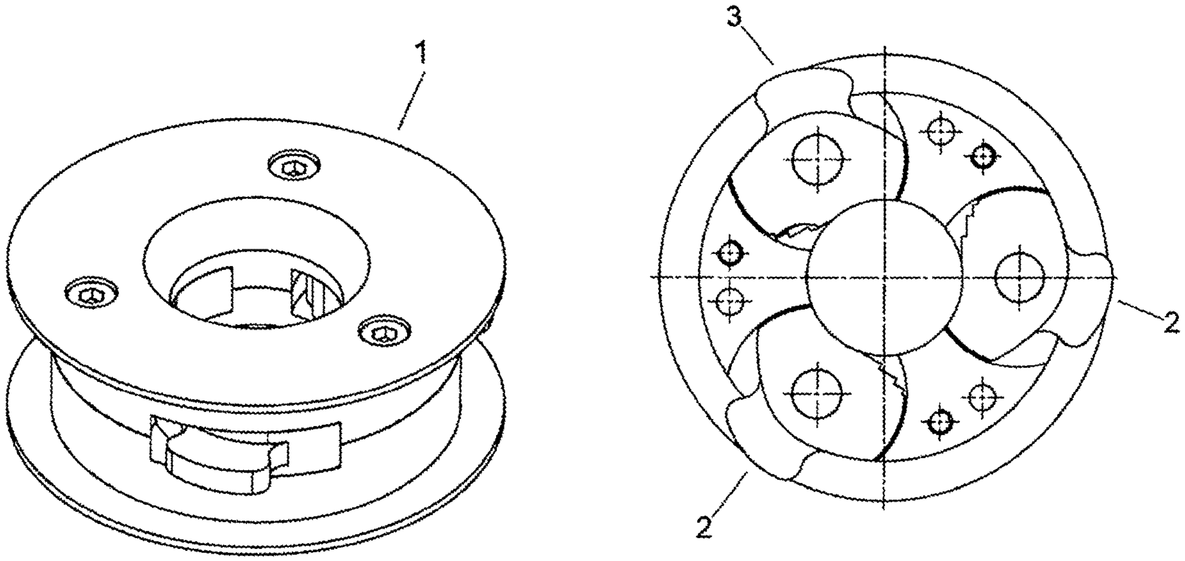
FIG. 1 is a perspective and cut-away plan view of the electrode cap removal device 1 according to the present invention, in the mounted, ready-for-use state.
Figure 2:
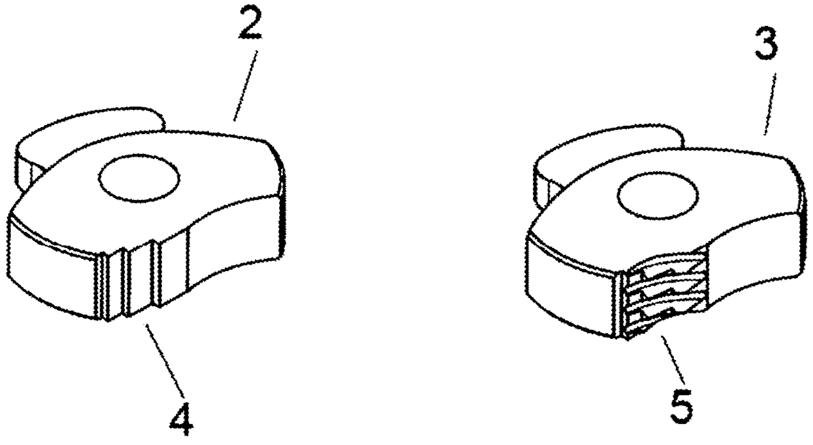
FIG. 2 shows the clamping device (2 and 3) having straight teeth 4 and having helical teeth 5.
Figure 3:
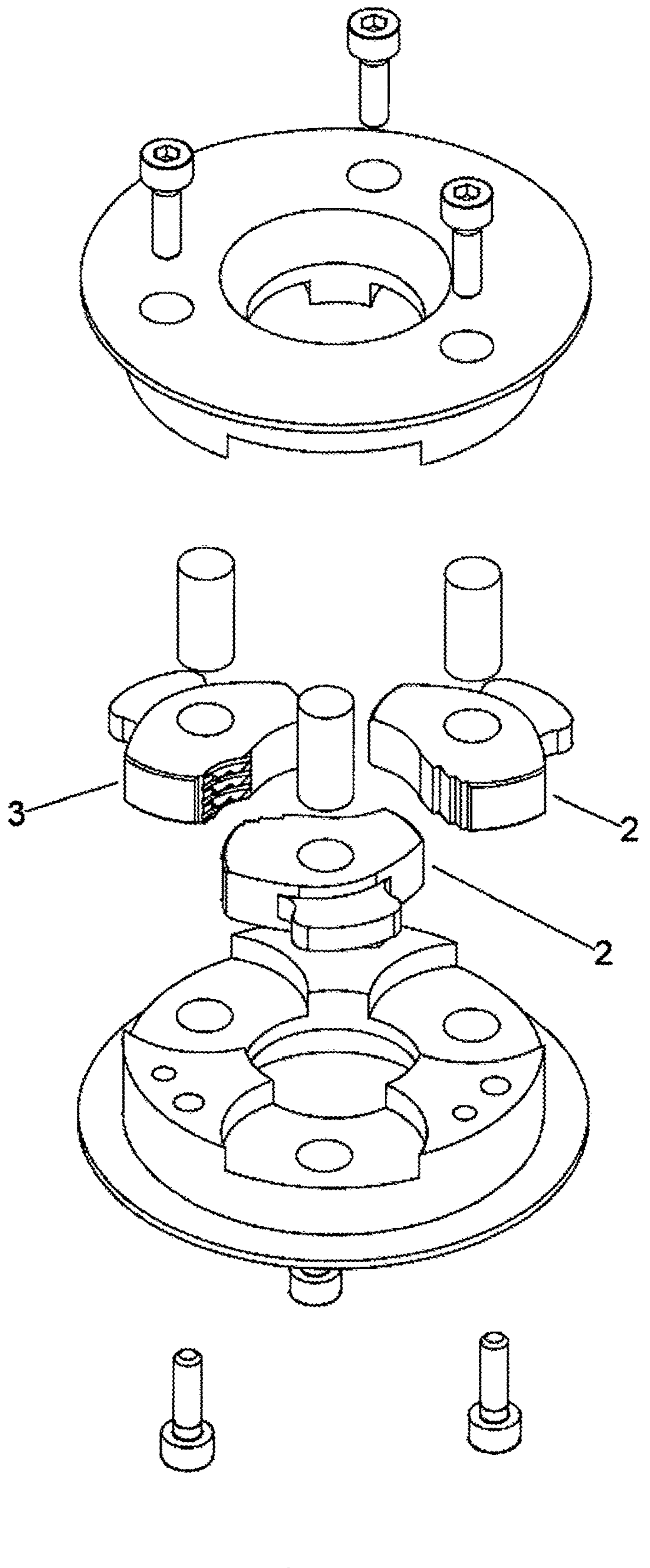
FIG. 3 is a blown-up illustration of the electrode cap removal device 1.

The removal device for an electrode cap consists of at least one electrode cap removal device 1 which is mounted so as to be rotatable about a tool axis of rotation and which comprises a clamping device 2, 3 for fixing the an electrode cap to be removed.

The electrode cap removal device 1 according to the present invention here comprises a combination of straight-toothed clamping device 2 and a helical-toothed clamping device 3. The use thereof according to the present invention of the combination comprising at least one straight-toothed clamping device 2 supports an early initiation of the rotational movement on the electrode cap to be released.

The use of at least one helical-toothed clamping device 3 provides a sufficient form-fitting connection by cutting into the copper material, and thus securing against an uncontrolled release/loss of the released cap.

The combination of the toothing types thus provides a process-reliable release, holding, and laying down of the electrode cap at the desired location.

In an embodiment of the present invention, it is possible, for example, to select the straight-toothed clamping device 2 and the helical toothed clamping device 3 so that a majority of the straight-toothed clamping device 2 and the helical toothed clamping device 3 which are used are either the straight-toothed clamping device 2 or alternatively the helical toothed clamping device 3.

It is particularly advantageous that the solution according to the present invention can also be used in removal devices already in use. In this case, identical clamping devices previously used can be varied so that at least one clamping device can be exchanged for a clamping device of the other embodiment.

The present invention is not limited to embodiments described herein; reference should be had to the appended claims.

LIST OF REFERENCE NUMERALS

1 Electrode cap removal device
2 Straight-toothed clamping device
3 Helical-toothed clamping device
4 Straight teeth
5 Helical teeth

What is claimed is:

1. A system for removing an electrode cap from an electrode shaft, the system comprising:

at least one electrode cap removal device which is mounted so as to be rotatable about a tool axis of rotation, wherein, the at least one electrode cap removal device comprises a clamping device for fixing the electrode cap to be removed, and the clamping device comprises a combination of a straight-toothed clamping device and a helical-toothed clamping device, wherein the combination of the straight-toothed clamping device and the helical-toothed clamping device of the clamping device is provided so that twice as many of the straight-toothed clamping devices are provided with respect to the helical-toothed clamping device.

2. The system as recited in claim 1, wherein the combination of the straight-toothed clamping device and the helical-toothed clamping device of the clamping device is provided as two straight-toothed clamping devices and one helical-toothed clamping device.

3. The system as recited in claim 1, wherein the clamping device is configured so that a majority of the straight-toothed clamping device and the helical toothed clamping device which are used are either the straight-toothed clamping device or alternatively the helical toothed clamping device.

4. A method of using of a combination of a straight-toothed clamping device and a helical-toothed clamping device in an electrode cap removal device, wherein, the electrode cap removal device is mounted so as to be rotatable about a tool axis of rotation, the electrode cap removal device comprises a clamping device for fixing an electrode cap to be removed, and the clamping device comprises the combination of the straight-toothed clamping device and the helical-toothed clamping device, the method comprising:

providing the combination of the straight-toothed clamping device and the helical-toothed clamping device as the clamping device for the electrode cap removal device; and using the combination of the straight-toothed clamping device and the helical-toothed clamping device as the clamping device for the electrode cap removal device to remove the electrode cap from an electrode shaft, wherein the combination of the straight-toothed clamping device and the helical-toothed clamping device of the clamping device is provided so that twice as many of the straight-toothed clamping devices are provided with respect to the helical-toothed clamping device.

5. The method as recited in claim 4, wherein the combination of the straight-toothed clamping device and the helical-toothed clamping device of the clamping device is provided as two straight-toothed clamping devices and one helical-toothed clamping device.

6. The method as recited in claim 4, wherein, the clamping device is configured so that a majority of the straight-toothed clamping device and the helical toothed clamping device which are used are either the straight-toothed clamping device or alternatively the helical toothed clamping device, and the step of using the combination of the straight-toothed clamping device and the helical-toothed clamping device as the clamping device for the electrode cap removal device to remove the electrode cap from the electrode shaft is performed so that a majority of the straight-toothed clamping device and the helical toothed clamping device which are used are either the straight-toothed clamping device or alternatively the helical toothed clamping device.

* * * * *